United States Patent [19]

Walker

[11] 4,200,345
[45] Apr. 29, 1980

[54] LARGE-DIAMETER DUST GUARD FOR A LOCOMOTIVE AXLE BEARING

[75] Inventor: Dale C. Walker, Erie, Pa.

[73] Assignee: General Electric Company, Erie, Pa.

[21] Appl. No.: 927,786

[22] Filed: Jul. 25, 1978

[51] Int. Cl.² .............................................. F16C 33/72
[52] U.S. Cl. ................... 308/36.1; 277/128; 277/DIG. 4
[58] Field of Search ............. 308/36.1, 36, 187, 187.1; 277/152, 147, 128, DIG. 4; 295/36 R

[56] References Cited

U.S. PATENT DOCUMENTS

| | | | |
|---|---|---|---|
| 1,383,466 | 7/1921 | Jett | 277/152 |
| 2,054,861 | 9/1936 | Oelkers | 295/36 R |
| 2,954,263 | 9/1960 | Kalny | 308/36.1 |
| 3,307,885 | 3/1967 | Cox | 308/36.1 |
| 3,433,541 | 3/1969 | Drabik | 308/36.1 |
| 3,689,084 | 9/1972 | Smedley | 277/147 |
| 3,713,709 | 1/1973 | Staiger | 295/36 R |

*Primary Examiner*—Lenard A. Footland
*Attorney, Agent, or Firm*—A. S. Richardson, Jr.

[57] ABSTRACT

The axial gap between the rotatable hub of a locomotive wheel and the relatively stationary thrust flange of an adjacent axle bearing is covered by a dust guard comprising an annular band of elastomeric material firmly secured to the circumference of the thrust flange and having a portion that overlaps the wheel hub. On the inside circumference of the overlapping portion of the annular band there is attached a narrow felt tape that slidingly engages the perimeter of the rotatable wheel hub to form a seal therewith, and the overlapping portion is encircled by a large-diameter hose clamp that enables a desired amount of radial pressure to be applied substantially uniformly around the felt tape.

11 Claims, 5 Drawing Figures

U.S. Patent  Apr. 29, 1980  Sheet 3 of 3  4,200,345
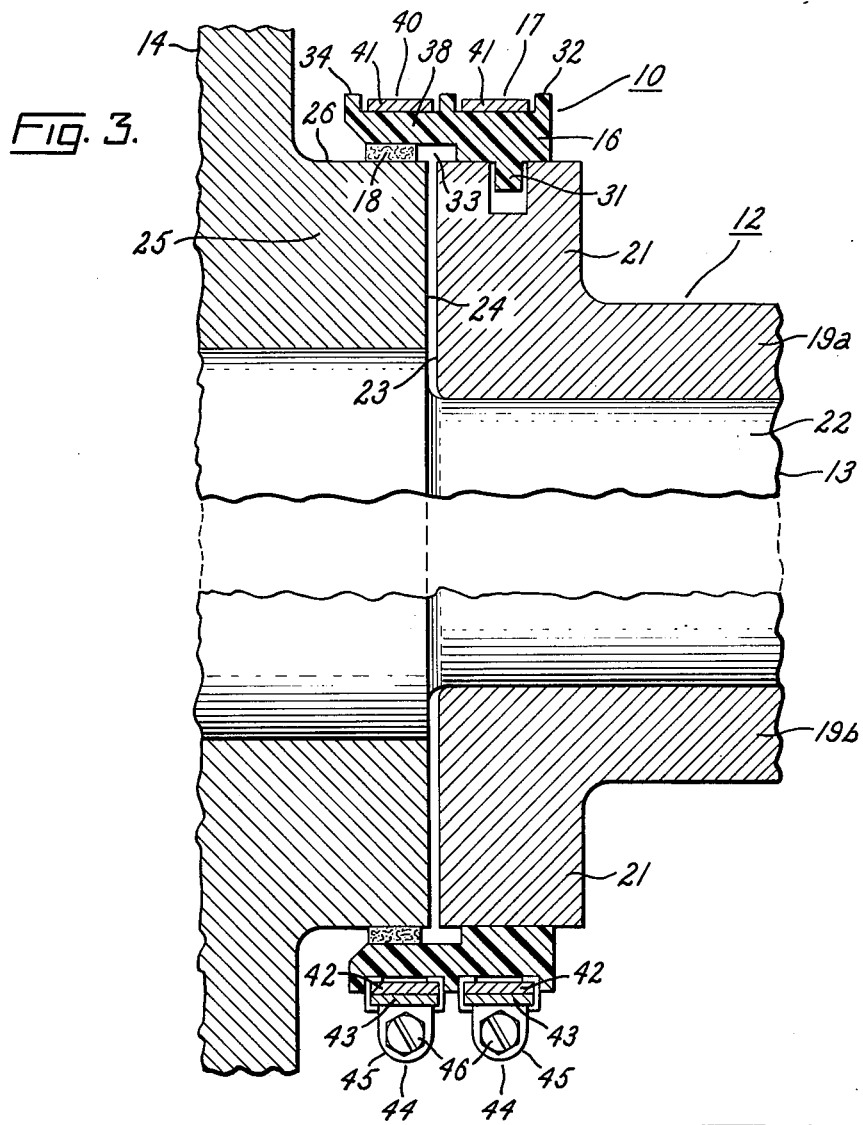
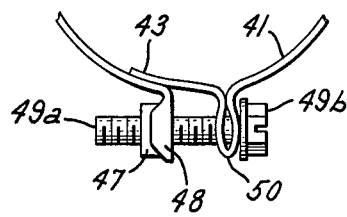
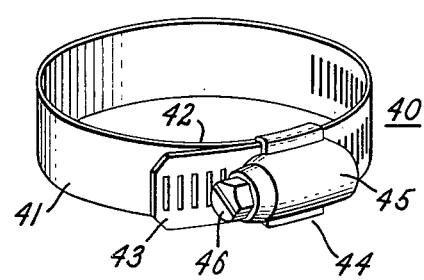

LARGE-DIAMETER DUST GUARD FOR A LOCOMOTIVE AXLE BEARING

BACKGROUND OF THE INVENTION

This invention relates generally to dust guards for the support bearings of axle-mounted electric traction motors, and it relates more particularly to an improved dust guard adapted to cover the axial gap between a hub of the wheel of an electrically propelled traction vehicle and the thrust flange of the adjacent motor support axle bearing.

Propulsion of an electric or a diesel-electric locomotive is accomplished by means of a plurality of traction motors mounted on the trucks of the locomotive between the wheels that are attached to opposite ends of the respective axles. Typically such a motor is designed to be supported by or hung from the axle, with its magnetic frame or stator being connected to suitable axle bearings, and one end (the "pinion" end) of the motor rotor is drivingly coupled to the associated wheel set by suitable gearing. Because of their proximity to the road bed of the railroad track, the axle bearings are exposed during operation of the locomotive to a hostile environment of dirt and other undesirable contaminants. Therefore it has been customary in this art to provide dust guards to impede entrance of dirt and other foreign matter into the bearing regions. While the improved dust guard that is disclosed and claimed hereinafter is particularly well suited for use in conjunction with the axle bearing located at the commutator end of a d-c traction motor on a locomotive, it should be understood at the outset that my invention can alternatively be adapted for use in other settings where its attributes are needed.

In a dust guard the material used for sealing the gap between the relatively stationary axle bearing housing and the rotating wheel hub should be resiliently compressible and should have a relatively low coefficient of sliding friction against metal. In addition, the material should not deteriorate in the presence of lubricating oil and should be relatively stable over a wide range of temperatures. One material having all of these desirable characteristics is felt, and because it prevents lubrication loss from within and entrance of dirt, dust, and grit from outside, felt has been widely used as the sealing medium in prior art dust guards.

In one type of prior art dust guard, as illustrated by U.S. Pat. Nos. 2,954,263 and 3,307,885, a felt annulus is held in frictional engagement with the wheel hub surface by means of a metal ring that is either integral with or attached as a unitary part of the thrust flange of the adjacent axle bearing. This approach has certain shortcomings, due partly to dimensional variations between the circumferences of the wheel hub and of the thrust flange. Within predetermined small tolerances, these parts may vary in their outside diameters, or their centerlines may be eccentric, or they may be slightly out of round.

It is also known to use the resilience of an annular elastomeric band to bias the felt annulus into frictional engagement with the wheel hub surface. An advantageous embodiment of this prior art approach is disclosed and claimed in U.S. Pat. No. 3,713,709—Staiger, and the present invention is an improvement of the Staiger dust guard. While the Staiger dust guard has provided satisfactory service, in some applications it has not been as effective as desired with respect to preventing dirt and other foreign particles from working their way under the felt annulus into the axial gap between the rotating wheel hub and the relatively stationary thrust flange of the adjacent axle bearing. Ingress of any dirt is of course undesirable because it can clog the axle lubricating wick of the bearing, thereby reducing the flow of lubricating oil to the bearing interfaces, and because it can cause excessive wear of the thrust flange face, thereby permitting increased end play and vibration of the traction motor.

In the art of oil seals it has heretofore been suggested to increase radial bias or pressure by putting a garter spring around the outside of the sealing annulus (see U.S. Pat. No. 1,383,466—Jett). There are a number of reasons why such an arrangement is not practical in a dust guard for an axle bearing of a locomotive. The spring could be damaged or broken by the impact of loose stones that are dislodged with great force from the road bed under the locomotive. The initial installation of a garter spring on a dust guard, and its later dismantling for maintenance or repair purposes, is not feasible because of the relatively large force required to stretch the spring and because of the very confined space available in the vicinity of the dust guard.

In order to remove an axle bearing or a traction motor from the axle of a locomotive for repair or replacement purposes, the dust guard must first be removed from the thrust flange and later reassembled, and these tasks are made very difficult by the narrow, inaccessible area in which the dust guard is located. Access to the dust guard is limited by the physically bulky parts between which it is located, namely, the locomotive wheel on one side and the traction motor housing and axle bearing cap on the other side.

SUMMARY OF THE INVENTION

Accordingly, a general objective of my invention is to provide an improved dust guard that, compared to the prior art dust guard of Staiger, is more effective in keeping dirt out of the axial gap between a wheel hub and the adjacent thrust flange of an axle bearing and is equally convenient to assemble and disassemble in a confined space.

Another general objective of the invention is to provide an inexpensive, durable axle bearing dust guard made of readily available components combined in a novel manner that effectively prevents ingress of dirt into an axial gap between a thrust flange of the axle bearing and a wheel hub even though the flange and hub are misaligned or have different external dimensions.

In one form my improved dust guard comprises a strip of elastomeric material having sufficient length to be snugly wrapped around an axle bearing thrust flange where it forms a continuous annular band except for a single split at abutting ends of the strip. First means (such as a hose clamp) is provided for firmly securing the annular band to the circumference of the thrust flange. The strip of elastomeric material has sufficient width so that a portion of the annular band overlaps the perimeter of a rotatable wheel hub that is affixed to the axle adjacent to the thrust flange, whereby the annular band covers the axial gap between the wheel hub and the axle bearing thrust flange. A narrow felt tape (e.g., one centimeter wide) is attached to the inside circumference of the overlapping portion of the annular band to form a sealing annulus that slidingly engages the perimeter of the rotatable wheel hub. Second means (such as another hose clamp) is provided for applying radial pressure to the overlapping portion of the annular band, thereby increasing pressure on the sealing annulus of felt. More particularly, the second means comprises a flexible metal member of fixed length encircling the overlapping portion of the annular band, and clamping means for releasably fastening one end of the encircling member to a part of the same member near its opposite end. The clamping means includes manually operable means for applying a predetermined amount of tangential force to the encircling member which is thereby put in tension, and the latter member consequently exerts radial pressure substantially uniformly around the felt annulus. Surprisingly, just the right amount of radial pressure is obtained (i.e., enough pressure to materially improve the dirt filtering capability of the felt annulus but not enough to cause the felt to run too hot or to be crushed beyond its recovery limit) when the aforesaid predetermined amount of tangential force approaches the predesigned limit of tangential force that can be obtained in a standard hose clamp whose diameter is approximately 25 centimeters or larger. The outside diameter of the hub of a typical locomotive wheel is approximately 26.7 centimeters. Consequently, in the preferred embodiment of my improved dust guard the aforesaid second means is a standard hose clamp tightened to its usual permissible maximum extent. The flexibility of the hose clamp together with the resilient character of the annular elastomeric band will ensure desired uniformity of pressure on the felt annulus notwithstanding discrepancies, within reasonable limits, in the dimensions or alignment of the wheel hub compared to the adjacent thrust flange.

BRIEF DESCRIPTION OF THE DRAWINGS

My invention will be better understood and its various objects and advantages will be more fully appreciated from the following description taken in conjunction with the accompanying drawings in which:

FIG. 3 is an enlarged view of a portion of FIG. 1 showing the dust guard, the thrust flange of the axle bearing, and the wheel hub in cross section;

FIG. 4 is a reduced perspective view of one of the hose clamps used in the illustrated dust guard; and FIG. 5 is a partial view of an alternative hose clamp.

DETAILED DESCRIPTION OF THE PREFERRED EMBODIMENT

Figure 1:
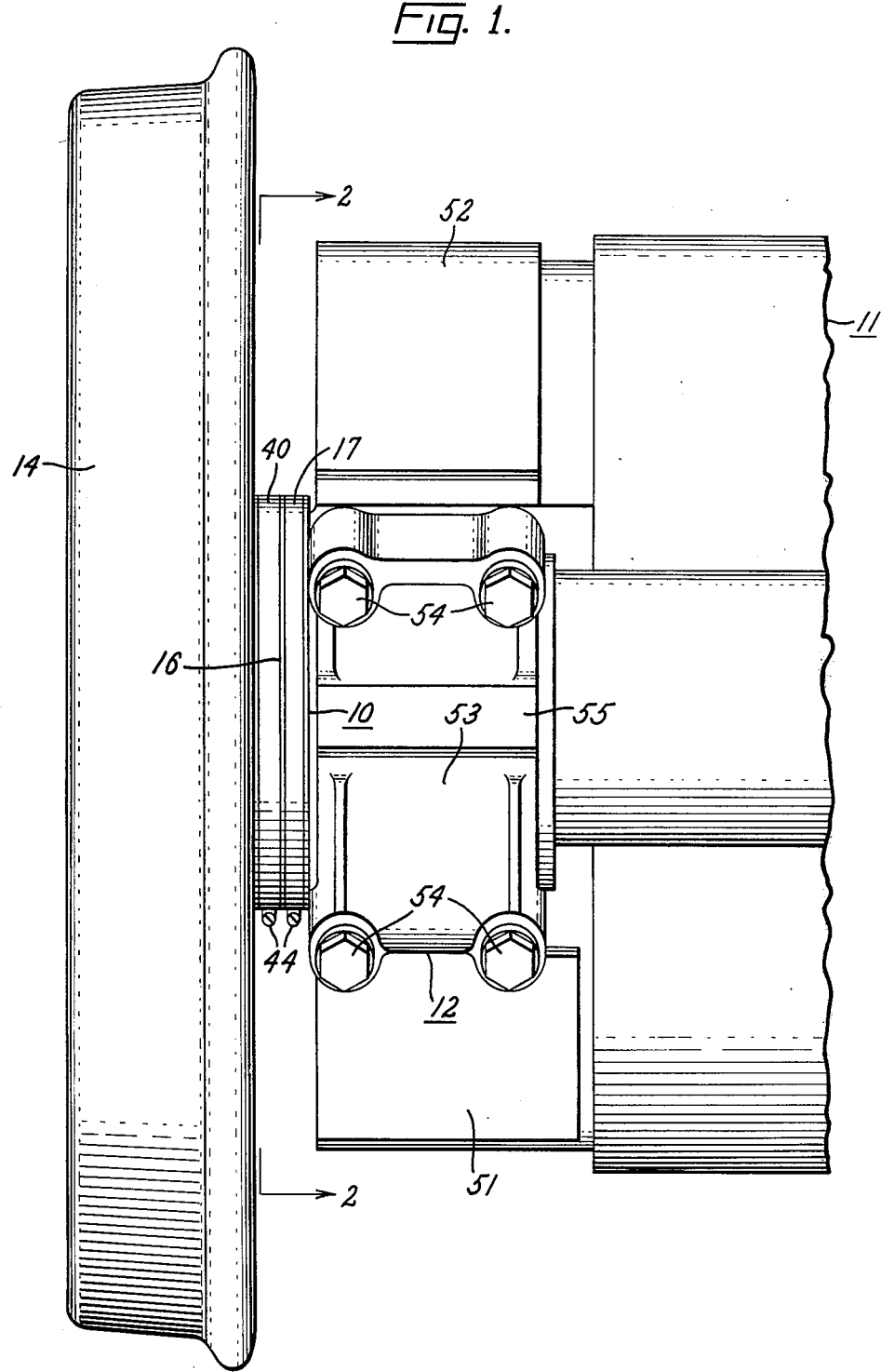
FIG. 1 is a partial side elevation of the improved dust guard installed on a traction motor supporting axle bearing on the inboard side of a locomotive wheel.
Figure 2:
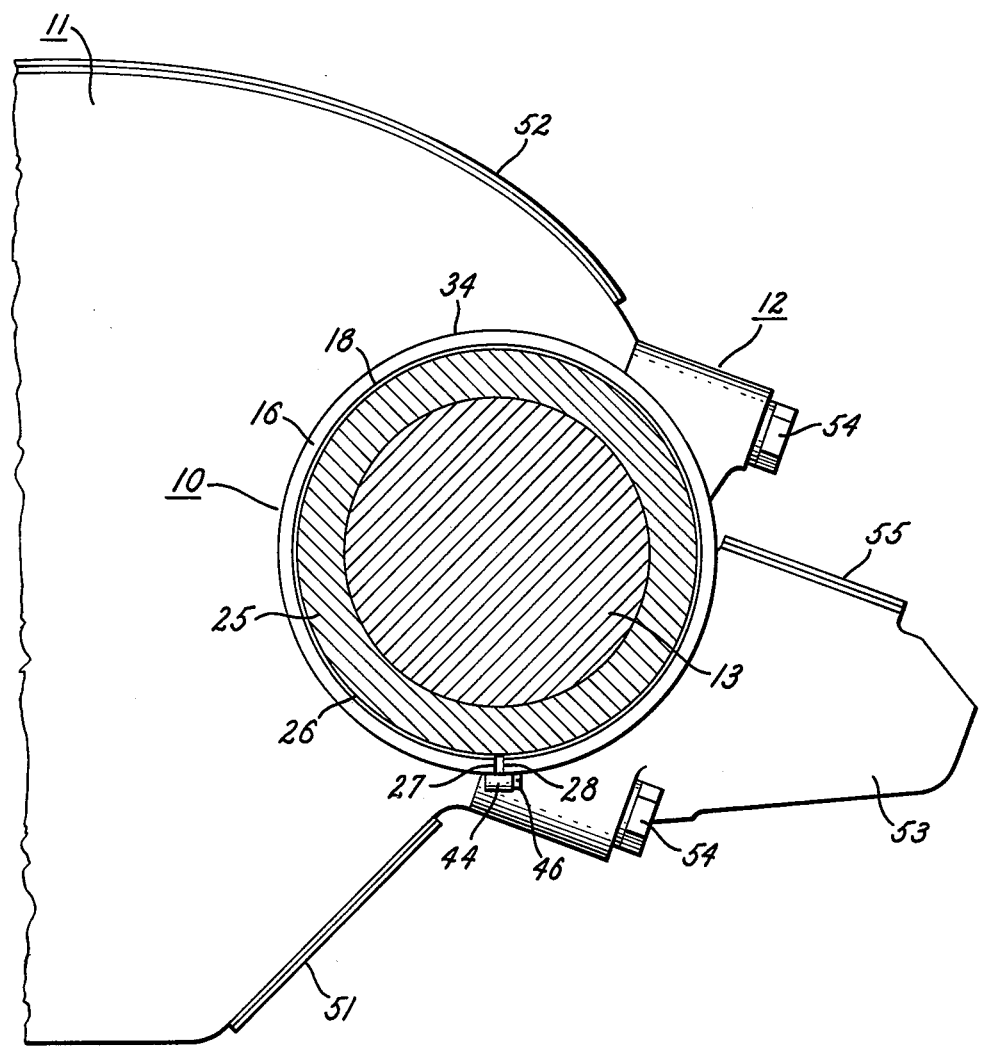
FIG. 2 is a cross-sectional view taken through line 2—2 of FIG. 1.

With reference now to FIGS. 1 and 2, my improved dust guard 10 is shown in its installed relationship with a conventional traction motor 11 of a traction vehicle such as an electric or diesel-electric locomotive, an axle bearing 12 surrounding a rotatable axle 13, and a driven wheel 14 affixed to the axle 13. The dust guard 10 is intended to prevent dirt particles from entering the axial gap between the metal hub of the wheel 14 and an adjacent thrust flange of the axle bearing 12, whereby the interfaces between bearing, axle, and wheel hub are protected from contamination, and this purpose is well served by using an arrangement generally similar to the one disclosed in the Staiger patent that was cited in the introductory portion of this specification. The disclosure of Staiger is herein incorporated by reference.

The dust guard 10 basically comprises an annular band 16 of elastomeric material, a first hose clamp 17 for firmly securing the band 16 to the circumference of the axle bearing thrust flange, a sealing annulus 18 of felt attached to the inside circumference of a portion of the annular band overlapping the perimeter 26 of the wheel hub 25, and, in accordance with the present invention, a second hose clamp 40 for constricting the overlapping portion of the band 16 and thereby compressing the sealing annulus 18. The construction of this particular dust guard and its advantages will soon be explained in more detail.

The motor 11 is preferably a conventional d-c traction motor having a stator and a rotor. It is disposed between the illustrated wheel 14 and a companion wheel that share the same axle 13 and form a wheelset therewith. Its stator or frame is mounted on the axle be means of the axle bearing 12 and another similar axle bearing located at the right-hand end of the motor (not shown in FIG. 1) where the motor rotor is drivingly coupled to the axle 13 by means of a pinion and suitable gearing (not shown). To prevent rotation of the motor frame, the housing of the motor is also fastened to the frame of the locomotive truck. (In accordance with conventional practice, each truck of a locomotive includes a frame supported by coil springs which are seated on the housings of journal boxes located at opposite ends of the respective axles of two or three wheelsets, and the superstructure and power plant of the locomotive are in turn supported on center plates mounted on the frames of two such trucks.) At its left-hand end the motor 11 includes a commutator and brushes (not shown). Access to the brushholder mounts can be obtained through a hand hole cover 51 bolted to the housing of the motor, and the brushes themselves can be inspected and replaced through holes in the housing that are covered by hinged inspection covers, one of which is shown in FIGS. 1 and 2 at 52.

The axle bearing 12 is actually a split sleeve bearing comprising a pair of semi-cylindrical half sleeves 19a and 19b (see FIG. 3) disposed on opposite sides of the axles 13. The half sleeve 19a has a solid metal wall and mates with a concave axle bore of the relatively stationary magnetic frame of the motor 11, whereas the half sleeve 19b has a window in its wall and is disposed in an axle bearing cap 53. The cap 53 is fastened to the motor frame by four bolts 54, thereby clamping the bearing 12 and the motor 11 to the axle 13. The bearing sleeves 19a and 19b are keyed to the motor frame to prevent relative rotation therebetween.

Inside the axle bearing cap 53 a lubricator wick (not shown) extends from a reservoir of lubricating oil, through the window in the bearing sleeve 19b, and into lubricating contact with the bearing surface 22 of the rotating axle 13. The wick is held in place by a suitable spring loaded bracket that is suspended from the underside of a removable carrier plate 55 on the cap 53. The cap 53 includes plugged fill and drain holes for the lubricating oil. For more details of a typical axle bearing of this type, see U.S. Pat. No. 2,954,263—Kalny.

As is shown in FIG. 3, the half sleeves 19a and 19b of the axle bearing 12 terminate in a radially outwardly projecting metal thrust flange 21 that offers an axially facing thrust surface 23 cooperating with an opposed complementary thrust face 24 of the rotatable metal wheel hub 25. The lubricating oil that is fed by the lubricator wick to the bearing surface 22 of the axle 12 and to the journal surfaces of the bearing sleeves 19a and 19b will also flow into the axial gap between the thrust surfaces 23 and 24 where it reduces friction and minimizes wear of these juxtaposed surfaces. Preferably the outside diameter of the thrust flange 21 is substantially the same as the outside diameter of the wheel hub 25, and in a typical locomotive both are of the order of 27 centimeters or larger.

The annular band 16 of the dust guard 10 is actually formed by a strip of elastomeric material having sufficient length (e.g., approximately 84 centimeters) to be snuggly wrapped around the thrust flange 21. Consequently, the band 16 is continuous except for a single split at the abutting ends 27 and 28 of the elastomeric strip. This design allows the band to be installed and removed without pulling the wheel 14 from the axle 13. The elastomeric material (preferably a Buna N compound) is springy in nature and has a coefficient of friction sufficient to provide adequate frictional engagement between the inner surface of the annular band 16 and the outer periphery of the metal thrust flange 21 so as to substantially eliminate any relative movement therebetween after installation of the dust guard 10. A radially inwardly protruding stud 31 on the band 16 fits into a corresponding hole in the thrust flange 21 to circumferentially position the band with its split at the underside of the axle, thereby simplifying removal and replacement of the dust guard. An annular rib 32 is formed on the periphery of the band 16 at one edge thereof. This rib is adjacent to the housing of the motor 11 and provides an axial positioning reference for the first hose clamp 17 that secures the band 16 to the thrust flange 21.

As is best seen in FIG. 3, the width of the annular band 16 in the axial direction is greater than that of the axle bearing thrust flange 21 so that the band covers the axial gap between the wheel hub 25 and the thrust flange, and a portion 38 of the band overlaps the wheel hub. On the inner surface of this overlapping portion of the band 16 there is formed an annular indent 33 for the placement of the sealing annulus 18 therein. The sealing annulus 18 comprises a relatively narrow strip of resilient material having the same length as the elastomeric strip that forms the annular band 16. It is permanently attached to the inside circumference of the overlapping portion 38 of the band 16 by a suitable adhesive and/or by being sewn thereto, and its single split coincides with that of the band 16. Preferably the width of the sealing annulus 18 is approximately one centimeter.

The sealing annulus 18 slidingly engages the perimeter 26 of the rotatable metal wheel hub 25 to prevent the loss of lubricating oil from within the axle bearing 12 and to prevent the entrance of dirt, dust, and grit into the lubricated regions of the bearing. The material of the sealing annulus is compressible and absorbent, is relatively stable over a wide range of temperature (e.g., from $-40°$ to $+50°$ Celsius), and has a low coefficient of sliding friction against metal (e.g., less than 0.3). A high-density felt tape (e.g., SAE No. F-3) having a nominal thickness of approximately 0.3 centimeter has all of these desired characteristics and is commonly used as the sealing annulus in dust guards for locomotive axle bearings.

At the edge of the annular elastomeric band 16 nearest to the wheel 14, an annular lip 34 is formed on the periphery of the band. As is shown in FIG. 3, the lip 34 axially positions the second hose clamp 40 directly over the felt sealing annulus 18 and ensures that the hose clamp will not slip off while being installed. The function of the second hose clamp 40 is to increase the compressive force that the overlapping portion 38 of the elastomeric annular band 16 applies to the felt sealing annulus 18, thereby increasing the effectiveness of the dust guard 10.

As is indicated in FIG. 4, the hose clamp 40 comprises a flexible metal member 41 of fixed length (such as a flat, thin-walled band of stainless steel) and clamping means 44 for releasably fastening one end 42 of the flexible member 41 to a part of this member near its opposite end 43. In practice the flexible member or band 41 is installed like a hoop around the overlapping portion 38 of the annular elastomeric band 16, and the clamping means 44 is then fastened and manually tightened so as to apply an adjustable amount of tangential force that puts the encircling band 41 in tension. This constricts the hoop and thereby applies substantially uniform radial pressure around the full circumference of the encircled felt annulus 18.

Several varieties of hose clamps are available from different commercial sources. In some hose clamps the clamping means is a worm drive, and in others it is a simple nut and bolt. A worm drive type of hose clamp has been illustrated in FIG. 4 where it is seen to comprise a worm-drive screw housing 45 anchored or permanently attached to the first end 42 of the band 41. The longitudinal centerline of the screw in the housing 45 is parallel to the long dimension of the band 41. The screw has an exposed hexagon slotted head 46 that can be manually turned by either a screw driver or a socket wrench. The opposite or free end 43 of the band 41 has a series of transverse slots that are engaged by the threads of the screw when this end is inserted in the screw housing 45 between the housing and the band 41. As the screw is turned in a clockwise direction, the free end 43 of the band is advanced through the worm-drive housing 45 until the band 41 tightly grips the objects that it encircles. This applies a tangential force to the band 41 which consequently is put in tension, and the band 41 in turn exerts radial pressure substantially uniformly around the outside circumference of the overlapping portion 38 of the annular elastomeric band 16. As a result, both the overlapping portion 38 of the band 16 and the underlying felt annulus 18 are maintained in compression between the hose clamp 40 and the wheel hub 25, and the felt annulus 18 is held in good sealing contact against the perimeter 26 of the hub.

In one practical application of my improved dust guard, each of the hose clamps 17 and 40 were "Tridon" catalog No. HSS-188 worm gear clamps manufactured by the Dixon Valve and Coupling Company, Chestertown, Md. This hose clamp is of all stainless steel construction, and the width of its encircling band 41 is approximately 1.4 centimeters. Hose clamps of this type are very secure and durable in service. Alternatively, as previously mentioned, cooperating nut and bolt members could be used in lieu of the worm drive as the clamping means 44 of the hose clamp 40. This alternative is illustrated in FIG. 5 where a nut 47 is shown captured in a bracket 48 attached to one end of the steel band 41 and a bolt 49a is shown captured in another bracket 50 attached to part of the band 41 near its free end 43. The bolt 49a has a hexagon slotted head 49b that can be manually turned by either a screw driver or a socket wrench. The two ends of the band 41 are releasably fastened together by inserting the bolt 49a into the nut 47, and tangential force is adjustably applied to the band 41 by turning the bolt 49a.

While only two conventional styles of hose clamps have been shown and described by way of example, other styles are known in the art and can be used if desired. In all cases it is feasible in the confined space available to assemble and to disassemble the dust guard. The dust guard is assembled by placing the elastomeric band 16 over the thrust flange 21 and wheel hub 25, manipulating the band 16 until its stud 31 is in the locating hole of the thrust flange, looping the steel band 41 of each of the hose clamps 17 and 40 over the elastomeric band 16, manipulating the free end 43 of the steel band of each hose clamp until it is inserted in the associated clamping means 44, and, after the two ends of each steel band are thus fastened together, using a tool such as a screw driver or a socket wrench to tighten the clamping means until a desired amount of radial pressure is exerted on the encircled portions of the elastomeric band 16. The disassembly process is just the reverse. The tool used to tighten or to loosen the clamping means of the hose clamps needs to have an extra long shank so as to reach into the narrow space where the hose clamps are located. As is best seen in FIG. 1, this space is defined on one side by the locomotive wheel (which typically has a diameter greater than one meter) and on the other side by the housing of traction motor 11 and the axle bearing cap 53.

It can be shown that the radial pressure p (force per unit area) that the band of a hose clamp exerts on the curved wall of the encircled object is related to the tangential force F of the clamping means by the equation $p = 2F/wd$, where d is the inside diameter of the band and w is the axial dimension or width of the curved wall that is subjected to the radial pressure. There is a predesigned maximum limit of tangential force that the clamping means of a hose clamp can apply to the associated band. Commercially available hose clamps of the worm drive type, such as the "Tridon" HSS-188, are so constructed that their maximum obtainable tangential force is less than approximately 500 kilograms and is typically of the order of 450 kilograms. Once maximum tension in the encircling band is achieved, any attempt to further tighten the clamp will be ineffectual and will cause the worm drive either harmlessly to "slip" or permanently to fail. In a hose clamp having a simple nut and bolt type of clamping means, the same limit of tension can easily be obtained by using a bolt whose yield strength is reached when tightened by a torque that produces an axial load of approximately 450 kilograms in the bolt.

Assuming that the width of the felt sealing annulus 18 is approximately one centimeter, and letting F=450 kilograms, from the foregoing equation it will be seen that $p = 900/d$. So long as the inside diameter of the hose clamp is greater than approximately 25 centimeters, p will be no greater than 36 kg/cm$^2$. This amount of radial pressure on the sealing annulus will not overcrush the felt, yet it is ample to ensure the desired result of preventing dirt from passing between the elastomeric band 16 and the wheel hub 25. I believe that any amount of pressure in excess of approximately 20 kg/cm$^2$ will materially improve the dirt filtering performance of the prior art dust guard disclosed in the above-cited Staiger patent. With this added pressure being applied substantially uniformly around the felt annulus 18, the felt is forced to yield and to form a resilient, dimensionally stable dust barrier that closely conforms to the perimeter 26 of the wheel hub. As the wheel rotates, eccentricities in the hub perimeter (compared to the circumference of the stationary thrust flange 21) cause a cyclic deflection of the overlapping portion 38 of the elastomeric band 16. During such deflection, the amplitude of which can be as high as 0.15 cm, the felt annulus 18 is further compressed by high points on the hub perimeter and distends as necessary to remain in contact with low points.

From the foregoing analysis it will be apparent that the hose clamp 40 will exert a desired amount of radial pressure on the felt sealing annulus 18 when the clamping means 44 of the hose clamp is tightened to its usual permissible maximum extent which is approximately 80 to 90 percent of its yield point or ultimate limit. The amount of tangential force applied to the steel band 41 of the hose clamp 40 when the clamping means 44 is so tightened is of the order of 400 kilograms. To obtain this amount of tangential force, a torque of approximately 50 cm-kg needs to be exerted on the screw or bolt of the clamping means 44. A torque of 50 cm-kg is close to the maximum amount of torque that an average person can practically apply to the handle of an ordinary screw driver. Thus I have found that the desired amount of radial pressure on the felt sealing annulus 18 is obtained when the clamping means 44 of the hose clamp 40 is manually operated by a screw driver to a comfortable maximum hand tightness. In the general case the amount of tangential force (in kilograms) applied to the steel band 41 of the hose clamp 40 should preferably be in a range from approximately 10 to approximately 18 times wd (both in centimeters).

One of the advantages of my improved dust guard is that the clamping means 44 of the hose clamp 40 will automatically prevent too much pressure from being applied to the felt annulus 18. If tightened beyond the maximum limit of tangential force, the clamping means collapses. At this built-in limit of tangential force in a hose clamp of large diameter, the felt annulus is not overcompressed, i.e., the felt is not crushed beyond its recovery limit. This desired result is achieved by using clamping means that are coordinated with the diameter of the steel band and the width of the felt annulus so that the maximum obtainable pressure that the felt annulus can exert on the perimeter 26 of the wheel hub is less than approximately 40 kg/cm$^2$.

While a preferred form of my invention has been shown and described by way of illustration, many modifications will probably occur to those skilled in the art. It is contemplated therefore by the concluding claims to cover all such modifications as fall within the true spirit and scope of the invention.

What I claim as new and desire to secure by Letters Patent of the United States is:

1. For covering the axial gap between a rotatable metal hub of a wheel of a traction vehicle and the adjacent metal thrust flange of a motor supporting axle bearing disposed on the axle of the wheel in a cap that is fastened to the relatively stationary frame of an electric motor whose rotor is drivingly coupled to the wheel, the outside diameter of the wheel hub being of the order of 25 centimeters or larger, an improved dust guard located in a relatively narrow space defined on one side by said wheel and on the other side by said axle bearing cap and by the housing of said motor, said dust guard comprising:

(a) a strip of elastomeric material having sufficient length to be snugly wrapped around the thrust flange of the axle bearing where it forms a continuous annular band except for a single split at abutting ends of the strip, said strip of elastomeric material having sufficient width so that a portion of said annular band overlaps the perimeter of the wheel hub, whereby said annular band covers the gap between the wheel hub and the axle bearing thrust flange;

(b) first means for firmly securing said annular band to the circumference of the axle bearing thrust flange; and (c) second means for applying radial pressure to said overlapping portion of said annular band so as to maintain said overlapping portion in compression between said second means and said wheel hub, said second means comprising a flexible metal member of fixed length encircling said overlapping portion and clamping means for releasably fastening one end of said member to a part of said member near its opposite end, said clamping means including manually operable means for adjustably applying tangential force to said encircling member which consequently is put in tension, whereby said member will exert a desired amount of radial pressure substantially uniformly around the outside circumference of said overlapping portion of said annular band, said clamping means being so constructed and arranged that the maximum obtainable pressure on the perimeter of said wheel hub is less than approximately 40 kilograms per square centimeter.

2. The improved dust guard of claim 1 wherein said second means is a hose clamp comprising a thin-walled steel band encircling said overlapping portion and a worm drive including a screw in a screw housing, one end of said steel band being attached to said screw housing and the opposite end of said steel band having a series of transverse slots that are engaged by the threads of said screw when said opposite end is inserted in said screw housing.

3. The improved dust guard of claim 1 in which said second means is a hose clamp and said clamping means comprises cooperating nut and bolt members one of which is captured in a bracket attached to one end of said encircling member and the other of which is captured in another bracket attached to a part of the encircling member near its opposite end.

4. An improved dust guard as set forth in claim 1 and further comprising a relatively narrow strip of resilient material attached to the inside circumference of said overlapping portion of said annular band to form a sealing annulus that slidingly engages the perimeter of the rotatable wheel hub.

5. The improved dust guard of claim 4 in which a predetermined amount of tangential force is applied to said encircling member, said predetermined amount, in kilograms, being preferably in a range from approximately 10 to approximately 18 times wd, where w is the width (in centimeters) of said sealing annulus and d is the inside diameter (in centimeters) of said encircling member.

6. The improved dust guard of claim 4 wherein the material of said sealing annulus is compressible and has a low coefficient of sliding friction against metal.

7. The improved dust guard of claim 4 in which the material of said sealing annulus is compressible and absorbent.

8. The improved dust guard of claim 4 in which the material of said sealing annulus is compressible, is relatively stable over a wide range of temperature, and has a low coefficient of sliding friction against metal.

9. The improved dust guard of claim 4 in which said sealing annulus is a high-density felt tape having a width of approximately one centimeter.

10. The improved dust guard of claim 4 wherein said second means is a hose clamp comprising a thin-walled steel band encircling said overlapping portion and a worm drive including a screw in a screw housing, one end of said steel band being attached to said screw housing and the opposite end of said steel band having a series of transverse slots that are engaged by the threads of said screw when said opposite end is inserted in said screw housing.

11. The improved dust guard of claim 4 in which the periphery of the overlapping portion of said annular band includes a lip that axially positions said encircling member of said second means.

* * * * *